United States Patent
Zhang et al.

(10) Patent No.: US 12,110,231 B2
(45) Date of Patent: Oct. 8, 2024

(54) EXPANDED GRAPHITE AND PREPARATION METHOD THEREFOR

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); YICHANG BRUNP RECYCLING TECHNOLOGY CO., LTD., Hubei (CN)

(72) Inventors: Linshao Zhang, Guangdong (CN); Changdong Li, Guangdong (CN); Dingshan Ruan, Guangdong (CN); You Zhou, Guangdong (CN); Qiang Li, Guangdong (CN); Yong Cai, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN); YICHANG BRUNP RECYCLING TECHNOLOGY CO., LTD, Hubei (CN)

( * ) Notice: Subject to any disclaimer, the term of this patent is extended or adjusted under 35 U.S.C. 154(b) by 0 days.

(21) Appl. No.: 18/289,488

(22) PCT Filed: Aug. 31, 2022

(86) PCT No.: PCT/CN2022/116252
§ 371 (c)(1),
(2) Date: Nov. 3, 2023

(87) PCT Pub. No.: WO2023/109192
PCT Pub. Date: Jun. 22, 2023

(65) Prior Publication Data
US 2024/0239664 A1   Jul. 18, 2024

(30) Foreign Application Priority Data
Dec. 16, 2021 (CN) .......................... 202111540314.7

(51) Int. Cl.
*C01B 32/225* (2017.01)
*H01M 10/54* (2006.01)

(52) U.S. Cl.
CPC ........ *C01B 32/225* (2017.08); *C01P 2004/03* (2013.01); *H01M 10/54* (2013.01)

(58) Field of Classification Search
CPC ... C01B 32/225; C01P 2004/03; H01M 10/54
See application file for complete search history.

(56) References Cited

U.S. PATENT DOCUMENTS

2012/0321545 A1   12/2012   Jeon et al.
2022/0089963 A1*  3/2022    Lin .................... C10M 177/00

FOREIGN PATENT DOCUMENTS

| CN | 108689402 A | 10/2018 |
| CN | 110357081 A | 10/2019 |

(Continued)

OTHER PUBLICATIONS

Yasmin, Asma, Jyi-Jiin Luo, and Isaac M. Daniel. "Processing of expanded graphite reinforced polymer nanocomposites." Composites Science and Technology 66.9 (2006): 1182-1189.*

(Continued)

*Primary Examiner* — Richard M Rump
(74) *Attorney, Agent, or Firm* — Myers Wolin, LLC

(57) ABSTRACT

A preparation method comprises the following steps: (1) in a protective atmosphere, mixing a graphite powder with a metal peroxide and/or alkali metal superoxide, and leaving same to stand to obtain a mixed graphite-metal peroxide and/or graphite-alkali metal superoxide composite material; (2) putting the composite material prepared in step (1) into a liquid medium, which can react with the metal peroxide (Continued)

and/or the alkali metal superoxide, for a reaction to obtain intercalated graphite; and (3) heating the intercalated graphite prepared in step (2) to prepare the expanded graphite. The preparation method can effectively avoid the generation of harmful impurities such as sulfur and sulfides during the preparation process of the expanded graphite, thereby reducing environmental pollution.

10 Claims, 1 Drawing Sheet

(56) References Cited

FOREIGN PATENT DOCUMENTS

| | | |
|---|---|---|
| CN | 110357082 A | 10/2019 |
| CN | 114408916 B | 7/2023 |
| JP | H02-153811 A | 6/1990 |
| JP | 2002-154814 A | 5/2002 |

OTHER PUBLICATIONS

First Office Action issued by the State Intellectual Property Office of People's Republic of China for Chinese Patent Application No. 202111540314.7, dated Dec. 9, 2022, with an English translation.
Notification to Grant Patent Right for Invention issued by the State Intellectual Property Office of People's Republic of China for Chinese Patent Application No. 202111540314.7, dated May 11, 2023, with an English translation.

* cited by examiner

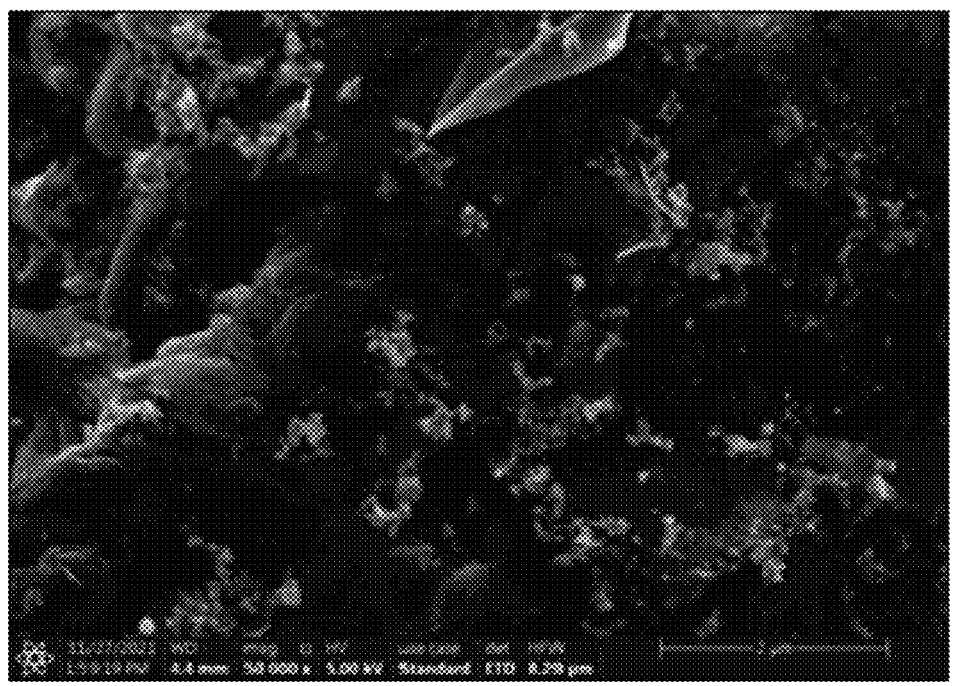

EXPANDED GRAPHITE AND PREPARATION METHOD THEREFOR

CROSS-REFERENCE TO RELATED APPLICATION

This application is a national stage filing under 35 U.S.C. § 371 of international application No. PCT/CN2022/116252, filed Aug. 31, 2022, which claims priority to Chinese patent application No. 20211150314.7, filed Dec. 16, 2021. The contents of these applications are incorporated herein by reference in their entirety.

TECHNICAL FIELD

The present invention belongs to the technical field of carbon material, and particularly, relates to an expanded graphite and a preparation method therefor.

BACKGROUND

An expanded graphite (EG) is a novel functional carbon material, which has a characteristic of high thermal conductivity, and may be used as a heat conduction material and an electrically conductive material. The expanded graphite is resistant to high temperature, high pressure and corrosion, and may be used to prepare an advanced sealing material. The expanded graphite may easily adsorb oils, organic molecules and hydrophobic substances, and may be used as an adsorption material with excellent performance. At present, the expanded graphite is widely applied in more than 20 fields, such as chemical engineering, building materials and environmental protection, is in huge demand, and is a research hotspot in the field of materials.

A preparation method for an existing expanded graphite is that: a natural flake graphite is processed with an intercalator and then expanded at a high temperature to obtain the expanded graphite, wherein the intercalator is mostly selected from the group consisting of sulfuric acid, nitric acid, phosphoric acid and ammonium persulfate, which results in that the prepared expanded graphite contains residual harmful elements and substances such as sulfur and sulfide.

SUMMARY

The present invention aims to solve at least one of the technical problems in the prior art. Therefore, the present invention provides an expanded graphite and a preparation method therefor, and the preparation method can effectively avoid harmful elements and substances such as sulfur and sulfide generated during preparation of the expanded graphite, thus reducing environmental pollution.

The technical objective of the present invention described above is achieved by the following technical solutions.

A preparation method for an expanded graphite comprises the following steps: (1) mixing a graphite powder with a metal peroxide and/or an alkali metal superoxide under a protective atmosphere, and leaving the mixture to stand still, to obtain a mixed graphite-metal peroxide and/or graphite-alkali metal superoxide composite material; (2) putting the composite material prepared in step (1) into a liquid medium capable of reacting with the metal peroxide and/or the alkali metal superoxide for reacting, to obtain an intercalated graphite; and (3) heating the intercalated graphite prepared in step (2) to prepare the expanded graphite.

Preferably, the metal peroxide is at least one of $CaO_2$, $K_2O_2$, $Na_2O_2$ and $Li_2O_2$.

Preferably, the alkali metal superoxide is at least one of $KO_2$ and $NaO_2$.

Preferably, a mass ratio of the graphite powder to the metal peroxide and/or the alkali metal superoxide in step (1) is (1 to 20):1.

Preferably, a time for leaving the mixture to stand still in step (1) is 12 hours to 24 hours.

Preferably, a temperature for the heating in step (3) is 1,000° C. to 1,500° C., and a time for the heating is 15 seconds to 30 seconds.

Preferably, the liquid medium is at least one of water, formic acid, acetic acid, propionic acid, hydrochloric acid, carbonic acid, citric acid, hydrofluoric acid, malic acid, gluconic acid, lactic acid, benzoic acid, acrylic acid, stearic acid, hydrosulphuric acid, hypochlorous acid and boric acid.

Preferably, a particle size of the graphite powder ranges from 80 meshes to 100 meshes.

Preferably, the graphite powder is obtained by washing, drying and sieving a leached residue of a waste lithium ion battery. The leached residue of the waste lithium ion battery are remaining leached residue after dissolving and leaching a preprocessed electrode material to allow a valuable metal in an active substance to enter a solution in a form of ion, and filtering the solution.

Preferably, the washing refers to washing to be neutral.

Preferably, a temperature for the drying is 50° C. to 60° C.

An expanded graphite is prepared by the preparation method described above.

The present invention has the beneficial effects as follows.

(1) Compared with an existing preparation method for an expanded graphite, the obtained expanded graphite of the preparation method for the expanded graphite of the present invention has no residual harmful elements and substances such as sulfur and sulfide, thus reducing environmental pollution.

(2) According to the preparation method for the expanded graphite of the present invention, the graphite is used as a raw material, other highly active metal peroxide and/or alkali metal superoxide is used as an intercalation material, hydrogen peroxide is generated based on the reaction of the metal peroxide and/or the alkali metal superoxide with the liquid medium to oxidize the graphite, positive charges are generated between layers of graphite sheets, and a spacing between the layers of graphite sheets is gradually increased under repelling interaction of the positive charges. Meanwhile, a large amount of oxygen gas is generated and released when the metal peroxide and/or the alkali metal superoxide reacts with the liquid medium to further increase expansion of the layers of graphite sheets, so that the finally prepared expanded graphite has a larger expanding volume.

(3) According to the preparation method for the expanded graphite of the present invention, the graphite in the leached residue of the waste lithium ion battery is used as a raw material, and recycled to prepare the expanded graphite. This method is simple in process and suitable for industrial production. Meanwhile, a negative electrode of graphite in a material for a waste lithium ion battery is recycled and reused with high assignment, which can not only solve a pollution problem of the leached residue, but also extract the graphite from the leached residue as the raw material to prepare the expanded graphite, thus realizing reuse of resource, the leached residue of the waste lithium ion battery.

BRIEF DESCRIPTION OF DRAWINGS

FIG. 1 is a SEM graph of an expanded graphite prepared in Example 1 of the present invention.

DETAILED DESCRIPTION OF EMBODIMENTS

The present invention is further described hereinafter with reference to the specific Examples.

Example 1

A preparation method for an expanded graphite comprised the following steps:
(1) washing a leached residue of a waste lithium ion battery, drying the leached residue in an oven at 60° C., and sieving the leached residue with an 80-mesh sieve to obtain a graphite powder;
(2) stirring and mixing the graphite powder with $CaO_2$ according to a mass ratio of 10:1, after stirring, repeatedly folding and rolling the mixture until the mixture was evenly mixed, and then placing the mixture in argon gas for 12 hours, to obtain an evenly mixed graphite-$CaO_2$ composite material;
(3) taking the mixed material described above out of the argon gas, and putting the mixed material into a propionic acid solution, wherein $CaO_2$ and propionic acid reacted rapidly to generate a gas, and the composite material expanded rapidly to disperse in the propionic acid, ultrasonically processing the solution for 1 hour after finishing the reaction, then repeatedly washing the composite material, and subjecting the composite material to suction filtration and separation to obtain an intercalated graphite; and
(4) transferring the intercalated graphite into a resistance furnace at 1,200° C. for heating for 20 seconds to prepare the expanded graphite.

The expanded graphite was prepared by the preparation method described above. It was measured that an expansion volume of the expanded graphite was 250 ml/g.

A SEM graph of the expanded graphite is shown in FIG. 1, and it can be seen from FIG. 1 that the expanded graphite prepared by the preparation method for the expanded graphite of the present invention has a loose structure.

Example 2

A preparation method for an expanded graphite comprised the following steps:
(1) washing a leached residue of a waste lithium ion battery, drying the leached residue in an oven at 60° C., and sieving the leached residue with a 100-mesh sieve to obtain a graphite powder;
(2) stirring and mixing the graphite powder with $Na_2O_2$ according to a mass ratio of 12:1, after stirring, repeatedly folding and rolling the mixture until the mixture was evenly mixed, and then placing the mixture in argon gas for 15 hours, to obtain an evenly mixed graphite-$Na_2O_2$ composite material;
(3) taking the mixed material described above out of the argon gas, and putting the mixed material into water, wherein $Na_2O_2$ and water reacted rapidly to generate a gas, and the composite material expanded rapidly to disperse in the water, ultrasonically processing the solution for 1 hour after finishing the reaction, then repeatedly washing the composite material, and subjecting the composite material to suction filtration and separation to obtain an intercalated graphite; and
(4) transferring the intercalated graphite into a resistance furnace at 1,200° C. for heating for 20 seconds to prepare the expanded graphite.

The expanded graphite is prepared by the preparation method described above. It was measured that an expansion volume of the expanded graphite was 270 ml/g.

Example 3

A preparation method for an expanded graphite comprised the following steps:
(1) washing a leached residue of a waste lithium ion battery, drying the leached residue in an oven at 60° C., and sieving the leached residue with an 80-mesh sieve to obtain a graphite powder;
(2) stirring and mixing the graphite powder with $K_2O_2$ according to a mass ratio of 15:1, after stirring, repeatedly folding and rolling the mixture until the mixture was evenly mixed, and then placing the mixture in argon gas for 20 hours, to obtain an evenly mixed graphite-$K_2O_2$ composite material;
(3) taking the mixed material described above out of the argon gas, and putting the mixed material into a 0.1 mol/L of hydrochloric acid solution, wherein $K_2O_2$ and hydrochloric acid reacted rapidly to generate a gas, and the composite material expanded rapidly to disperse in the hydrochloric acid, ultrasonically processing the solution for 1 hour after finishing the reaction, then repeatedly washing the composite material, and subjecting the composite material to suction filtration and separation to obtain an intercalated graphite; and
(4) transferring the intercalated graphite into a resistance furnace at 1,200° C. for heating for 20 seconds to prepare the expanded graphite.

The expanded graphite is prepared by the preparation method described above. It was measured that an expansion volume of the expanded graphite was 260 ml/g.

Example 4

A preparation method for an expanded graphite comprised the following steps:
(1) washing a leached residue of a waste lithium ion battery, drying the leached residue in an oven at 60° C., and sieving the leached residue with an 80-mesh sieve to obtain a graphite powder;
(2) stirring and mixing the graphite powder with $KO_2$ according to a mass ratio of 20:1, after stirring, repeatedly folding and rolling the mixture until the mixture was evenly mixed, and then placing the mixture in argon gas for 24 hours, to obtain an evenly mixed graphite-$KO_2$ composite material;
(3) taking the mixed material described above out of the argon gas, and putting the mixed material into a saturated carbonic acid solution, wherein $KO_2$ and carbonic acid reacted rapidly to generate a gas, and the composite material expanded rapidly to disperse in the carbonic acid solution, ultrasonically processing the solution for 1 hour after finishing the reaction, then repeatedly washing the composite material, and subjecting the composite material to suction filtration and separation to obtain an intercalated graphite; and
(4) transferring the intercalated graphite into a resistance furnace at 1,200° C. for heating for 20 seconds to prepare the expanded graphite.

The expanded graphite is prepared by the preparation method described above. It was measured that an expansion volume of the expanded graphite was 320 ml/g.

Example 5

A preparation method for an expanded graphite comprised the following steps:
(1) washing a leached residue of a waste lithium ion battery, drying the leached residue in an oven at 60° C., and sieving the leached residue with an 80-mesh sieve to obtain a graphite powder;
(2) stirring and mixing the graphite powder with $NaO_2$ according to a mass ratio of 20:1, after stirring, repeatedly folding and rolling the mixture until the mixture was evenly mixed, and then placing the mixture in argon gas for 24 hours, to obtain an evenly mixed graphite-$NaO_2$ composite material;
(3) taking the mixed material described above out of the argon gas, and putting the mixed material into water, wherein $NaO_2$ and water reacted rapidly to generate a gas, and the composite material expanded rapidly to disperse in the water, ultrasonically processing the solution for 1 hour after finishing the reaction, then repeatedly washing the composite material, and subjecting the composite material to suction filtration and separation to obtain an intercalated graphite; and
(4) transferring the intercalated graphite into a resistance furnace at 1,200° C. for heating for 20 seconds to prepare the expanded graphite.

The expanded graphite is prepared by the preparation method described above. It was measured that an expansion volume of the expanded graphite was 335 ml/g.

Example 6

A preparation method for an expanded graphite comprised the following steps:
(1) washing a leached residue of a waste lithium ion battery, drying the leached residue in an oven at 60° C., and sieving the leached residue with an 80-mesh sieve to obtain a graphite powder;
(2) stirring and mixing the graphite powder with $Li_2O_2$ according to a mass ratio of 20:1, after stirring, repeatedly folding and rolling the mixture until the mixture was evenly mixed, and then placing the mixture in argon gas for 24 hours, to obtain an evenly mixed graphite-$Li_2O_2$ composite material;
(3) taking the mixed material described above out of the argon gas, and putting the mixed material into a 2% citric acid solution, wherein $Li_2O_2$ and citric acid reacted rapidly to generate a gas, and the composite material expanded rapidly to disperse in the citric acid solution, ultrasonically processing the solution for 1 hour after finishing the reaction, then repeatedly washing the composite material, and subjecting the composite material to suction filtration and separation to obtain an intercalated graphite; and
(4) transferring the intercalated graphite into a resistance furnace at 1,200° C. for heating for 20 seconds to prepare the expanded graphite.

The expanded graphite is prepared by the preparation method described above. It was measured that an expansion volume of the expanded graphite was 320 ml/g.

Comparative Example 1

A preparation method for an expanded graphite comprised the following steps:
(1) washing a leached residue of a waste lithium ion battery, drying the leached residue in an oven at 60° C., and sieving the leached residue with an 80-mesh sieve to obtain a graphite powder;
(2) putting the graphite powder into a mixed solution of concentrated sulfuric acid and concentrated nitric acid according to a solid-liquid ratio of 1 g:150 ml, wherein a ratio of the concentrated sulfuric acid to the concentrated nitric acid in the mixed solution was 3:1, adding ammonium persulfate as an intercalator, reacting for 10 hours under a condition of stirring, filtering the solution after finishing the reaction, and adjusting pH to be equal to 7 by water washing for several times to obtain an intercalated graphite; and
(3) placing the intercalated graphite in argon gas, and roasting the intercalated graphite at 900° C. for 0.5 hours, to obtain the expanded graphite.

The expanded graphite is prepared by the preparation method described above. It was measured that an expansion volume of the expanded graphite was 220 ml/g.

In Comparative Example 1, the sulfuric acid is used as the intercalator and an oxidant, which is subjected to oxidative intercalation as a mixed solution with the nitric acid as an oxidant, assisted by the ammonium persulfate as an intercalator, to obtain the expanded graphite. In Comparative Example 1, the ammonium persulfate needs to be additionally added as the intercalator, and the expansion volume of the obtained expanded graphite is only 220 ml/g. In the present invention, an alkali, the reaction product of the metal peroxide and/or the alkali metal superoxide with the liquid medium is used as the intercalator, without adding other intercalators. Compared with Comparative Example 1, the expanded graphite prepared by the present invention is 250 ml/g or more, so that a larger expansion volume is obtained, and addition amounts of other impurities or pollutants are reduced, thus having a simple process and an industrialization prospect.

The above examples are the preferred embodiments of the present invention, but embodiments of the present invention are not limited to the above-described examples. Any other changes, modifications, substitutions, combinations, and simplifications made without departing from the spirit and principle of the present invention shall be equivalent substitute modes, and shall be included in the protection scope of the present invention.

The invention claimed is:

1. A preparation method for an expanded graphite, comprising the following steps:
(1) mixing a graphite powder with a metal peroxide and/or an alkali metal superoxide under a protective atmosphere, and leaving the mixture to stand still, to obtain a mixed graphite-metal peroxide and/or graphite-alkali metal superoxide composite material;
(2) putting the composite material prepared in step (1) into a liquid medium capable of reacting with the metal peroxide and/or the alkali metal superoxide for reacting, to obtain an intercalated graphite; and
(3) heating the intercalated graphite prepared in step (2) to prepare the expanded graphite,
wherein the metal peroxide is at least one of $CaO_2$, $K_2O_2$, $Na_2O_2$ and $Li_2O_2$;
the alkali metal superoxide is at least one of $KO_2$ and $NaO_2$; and
a mass ratio of the graphite powder to the metal peroxide and/or the alkali metal superoxide in step (1) is (1 to 20):1.

2. The preparation method for the expanded graphite according to claim 1, characterized in that, a time for leaving the mixture to stand still in step (1) is 12 hours to 24 hours.

3. The preparation method for the expanded graphite according to claim 1, characterized in that, a temperature for the heating in step (3) is 1,000° C. to 1,500° C., and a time for the heating is 15 seconds to 30 seconds.

4. The preparation method for the expanded graphite according to claim 1, characterized in that, the liquid medium is at least one of water, formic acid, acetic acid, propionic acid, hydrochloric acid, carbonic acid, citric acid, hydrofluoric acid, malic acid, gluconic acid, lactic acid, benzoic acid, acrylic acid, stearic acid, hydrosulphuric acid, hypochlorous acid and boric acid.

5. The preparation method for the expanded graphite according to claim 1, characterized in that, a particle size of the graphite powder ranges from 80 meshes to 100 meshes.

6. The preparation method for the expanded graphite according to claim 1, characterized in that, the graphite powder is obtained by washing, drying and sieving the leached residue of a waste lithium ion battery.

7. The preparation method for the expanded graphite according to claim 2, characterized in that, the graphite powder is obtained by washing, drying and sieving the leached residue of a waste lithium ion battery.

8. The preparation method for the expanded graphite according to claim 3, characterized in that, the graphite powder is obtained by washing, drying and sieving the leached residue of a waste lithium ion battery.

9. The preparation method for the expanded graphite according to claim 4, characterized in that, the graphite powder is obtained by washing, drying and sieving the leached residue of a waste lithium ion battery.

10. The preparation method for the expanded graphite according to claim 5, characterized in that, the graphite powder is obtained by washing, drying and sieving the leached residue of a waste lithium ion battery.

\* \* \* \* \*